(12) United States Patent
Woelfges (10) Patent No.: US 8,365,763 B2
(45) Date of Patent: Feb. 5, 2013

(54) PILOT-CONTROLLED PRESSURE LIMITING VALVE

(75) Inventor: Hans Woelfges, Lohr am Main (DE)

(73) Assignee: Robert Bosch GmbH, Stuttgart (DE)

( * ) Notice: Subject to any disclaimer, the term of this patent is extended or adjusted under 35 U.S.C. 154(b) by 768 days.

(21) Appl. No.: 12/278,661

(22) PCT Filed: Jan. 27, 2007

(86) PCT No.: PCT/EP2007/000714
§ 371 (c)(1),
(2), (4) Date: Mar. 26, 2009

(87) PCT Pub. No.: WO2007/093273
PCT Pub. Date: Aug. 23, 2007

(65) Prior Publication Data
US 2009/0314359 A1    Dec. 24, 2009

(30) Foreign Application Priority Data

Feb. 17, 2006    (DE) .......................... 10 2006 007 363

(51) Int. Cl.
*F16K 31/383* (2006.01)
(52) U.S. Cl. .................. 137/491; 137/492.5; 138/40
(58) Field of Classification Search .............. 137/488, 137/489, 491, 492.5; 138/40, 44, 45, 46, 138/41
See application file for complete search history.

(56) References Cited

U.S. PATENT DOCUMENTS

| | | | |
|---|---|---|---|
| 2,316,649 A * | 4/1943 | Jurs | 137/491 |
| 2,576,516 A * | 11/1951 | Jurs | 137/491 |
| 2,890,714 A * | 6/1959 | Greenwood et al. | 137/484.2 |
| 3,818,928 A * | 6/1974 | Carsten | 137/211.5 |
| 4,531,543 A * | 7/1985 | Markley | 137/515.7 |
| 4,548,231 A * | 10/1985 | Schwede | 137/491 |
| 5,072,752 A * | 12/1991 | Kolchinsky | 137/493 |

(Continued)

FOREIGN PATENT DOCUMENTS

| | | |
|---|---|---|
| DE | 25 47 646 | 4/1977 |
| DE | 43 04 796 | 8/1994 |
| DE | 195 24 900 | 1/1997 |

OTHER PUBLICATIONS

RE 25731/10.05 "Pressure Relief Valve, Pilot Operated", Rexroth Bosch Group. DB.K., 2005.

(Continued)

*Primary Examiner* — William McCalister
(74) *Attorney, Agent, or Firm* — Michael J. Striker (57) ABSTRACT

A pressure limiting valve has a control element (10) which can be acted on in an opening direction, against a first control face, by a pressure which is to be limited, and which can be acted on in a closing direction by a spring (16) and, against a second control face, by a control pressure prevailing in a control pressure space (14). The pressure prevailing in the control pressure space can be limited by means of a pilot control valve (21). A control fluid can be supplied to the control pressure space through the control element via a control fluid nozzle (48). Upstream of the first control face, a plate (38) is held on the control element. Formed between the plate and the first control face is a gap with a predefined gap dimension. Said gap is situated upstream of the control fluid nozzle.

17 Claims, 4 Drawing Sheets

U.S. PATENT DOCUMENTS

| | | | |
|---|---|---|---|
| 5,730,182 A * | 3/1998 | Ishizaki et al. | 137/491 |
| 6,161,570 A * | 12/2000 | McNeely | 137/491 |
| 6,745,792 B2 * | 6/2004 | Koo | 137/491 |
| 6,820,641 B2 * | 11/2004 | Larsen | 137/491 |
| 7,134,447 B2 * | 11/2006 | Boyer | 137/491 |

OTHER PUBLICATIONS

RE 25 818/08.03 Pressure Relief Valve Pilot Operated, Type DB (W) . . . W65. Rexroth Bosch Group. (2003).

* cited by examiner

PILOT-CONTROLLED PRESSURE LIMITING VALVE

BACKGROUND OF THE INVENTION

The present invention relates to a pilot-controlled pressure limiting valve.

A conventional pressure limiting valve of this type is described, e.g., in data sheet RD25731/10.05 or data sheet RD 25818/08.03 from Bosch Rexroth AG. When an adjustable limiting pressure is reached, a main control slide or main control cone releases the connection between an inlet connection and a tank connection. The particular main control element—either a cone or slide—is acted upon in the opening direction by the inlet pressure on a control surface that faces the inlet connection. A control surface facing away from the inlet connection limits a control pressure space. A spring is located therein, which acts on the main control element in the closing direction. In addition, a control pressure is maintained in the control pressure space. The control pressure is adjustable using a pilot-controlled pressure limiting valve. The precontrol valve is supplied with control fluid via a throttle bore with a small cross section that is located in the center of the main control element. This bore connects the control pressure space with the inlet connection.

An important characteristic value of the pressure limiting valve is its constant-pressure behavior. In this regard, one considers the change in inlet pressure P with volumetric flow rate Q that passes through the pressure limiting valve and to the tank. The characteristic curve P(Q) increases due to the system.

A cause for this increase in the P(Q) characteristic curve are flow forces that occur at the main control element when it opens. High flow speeds in the outflowing pressure medium occur in the region around the annular opening surface. The static hydraulic pressure is therefore reduced at this point, per Bernoulli's equation. In the edge regions of the main control element, the control surface facing the inlet is therefore acted upon with a lower pressure than the inlet pressure. The equilibrium condition at the main control element—according to which the force of the spring and the force exerted by the control pressure on the main control element and the force exerted on the inlet-side control surface must be equal in order to hold the pressure limiting valve open—results in the increase in inlet pressure when the volumetric flow rate increases. As stated, this effect may be described using the image of flow forces that act in the direction of closing of the main control element, and which must be compensated for with a higher inlet pressure. It is therefore difficult to prevent a certain increase in the P(Q) characteristic curve. With poppet valves, the flow forces are even used to dampen the main control cone.

With the conventional pilot-controlled pressure limiting valves described above, the quantity of control fluid also increases when the inlet pressure increases. Due to further throttle points in the control fluid path to the precontrol valve, and given that the P(Q) characteristic curve of the precontrol valve also increases, the increase in the P(Q) characteristic curve of the precontrolled pressure limiting valve is amplified.

SUMMARY OF THE INVENTION

The object of the present invention is to provide an improved pressure limiting valve that, in particular, has good equilibrium behavior, ensures reliable operation, and is easy to manufacture.

The inventive pressure limiting valve includes a control element that may be acted upon in the opening direction, on a first control surface, by a pressure that is to be limited, and that may be acted upon in the closing direction by a spring and, against a second control surface, by a control pressure that exists in a control pressure space. The pressure that exists in the control pressure space may be limited by a precontrol valve. Control fluid may be supplied to the control pressure space through the control element via a control fluid nozzle.

The present invention is characterized by the fact that a plate is held against the control element in front of the first control surface. A gap with a predefined gap dimension is formed between the plate and the first control surface. This gap is located upstream of the control fluid nozzle, i.e., the control fluid that is supplied to the control fluid nozzle flows through the gap. In this manner, a tap point for the supply of control fluid that is gap-shaped and expanded across a wide area of the first control surface is created using a component that is easy to manufacture and install, i.e., the plate. This tap point has very good filter action. The gap opening or a large portion of the gap opening is located—due to the two-dimensional expansion of the plate—in the edge region of the first control surface and, therefore, in a region in which high flow rates occur when the control element is open and pressure medium flows out. This prevents dirt particles from adhering to the gap. The gap filter formed by the gap opening prevents the control fluid nozzle in the control element and a damping nozzle from becoming clogged. The functional reliability of the valve is ensured as a result. In addition, an increase in the pressure level that occurs when fluid quantity Q to be released via the pressure limiting valve increases is partially compensated for in the edge region of the first control surface by the reduction in static pressure in the flowing pressure medium. By providing a plate, an increase in the quantity of control fluid that flows into the control pressure space may be largely prevented, and an increase in the precontrol pressure and, as a result, an increase in the P(Q) characteristic curve of the precontrolled pressure limiting valve may be reduced. Good constant-pressure behavior is realized as a result. The constant-pressure behavior may be easily optimized by adjusting the shape and size of the plate. It should be emphasized once more that the plate makes it particularly easy and cost-favorable to manufacture and install the inventive pressure limiting valve, with which a filter functionality at the control fluid tap point and a compensation of the increase in the P(Q) characteristic curve are attained. The main control element itself requires only slight modification, starting with a conventional design.

The gap dimension may be established easily and reliably when the control element includes a raised area on which the plate rests. For this purpose, a raised area may also be formed on a side of the plate facing the control element, via which the plate rests on the control element. This further simplifies the manufacture of the valve, since it is easier to manufacture a raised area on the plate than on the control element. The plate may be made of a material that is easier to work with than the control element, which is usually made of hardened steel. A nub-shaped embossing of the plate is particularly easy to manufacture.

According to a preferred refinement of the present invention, the plate includes a sleeve-shaped section that projects from a side of the plate facing the control element and that accommodates a fastening means, and with which the plate rests on the control element. A plate of this type is a component that is easy to manufacture, e.g., using a pressing or embossing procedure. The sleeve-shaped section serves simultaneously as a fastening means and a spacer, to establish the gap dimension. The location of the gap opening and the gap dimension are therefore determined solely by the geometric properties of the plate. To vary the gap dimension and to expand the gap on the first control surface radially, all that is required is that the plate be replaced.

It is particularly easy to install the plate on the control element when a circular cylinder-shaped threaded section is formed on the plate, with which the plate is fastened in a bore of the control element. It is then possible to simply screw the plate in place.

According to a further preferred embodiment of the present invention, the control fluid nozzle is designed as a bore in the threaded section. This results in particularly low manufacturing costs for the control element, since it may now be manufactured as a rotationally symmetric component with only one central screw-in opening.

According to a particularly preferred embodiment of the present invention, the control fluid nozzle is designed as a bore in the threaded section, and an opening in the bore is covered by the plate. This makes it possible to select a shape for the plate that is particularly easy to manufacture and that requires only a few processing steps.

In terms of the manufacturing effort involved, a preferred design for the plate is a circular disk.

The plate is preferably made of a metal that is easy to work with, e.g., brass, aluminum, or non-hardened steel. This simplifies the manufacture. The control element is typically made of hardened steel. A nozzle bore formed in the control element oxidizes when it hardens, and it must be reworked. This reworking step may be eliminated when the nozzle bore is formed in the plate, which is made of non-hardened material.

Reliable operation of the pressure limiting valve may be ensured when the gap dimension is smaller than the diameter of the control fluid nozzle or smaller than the diameter of a damping nozzle upstream of the precontrol valve. As a result, the nozzles are prevented from becoming clogged with dirt particles.

An adequate filter effect for the control fluid is attained when the gap dimension is less then 0.3 millimeters. A value between 0.25 millimeters and 0.15 millimeters is preferably selected.

According to a further preferred embodiment of the present invention, the control fluid nozzle opens toward an annular recess in the first control surface and/or to an annular recess in a side of the plate facing the first control surface. A recess of this type ensures that control fluid flows in evenly through the entire gap length. It also reduces a flow resistance that otherwise occurs at the transition from the gap to a bore and therefore prevents material wear.

According to particularly preferred embodiment, the plate is retained on a main control cone of the pressure limiting valve. With a pressure limiting valve in particular that is designed as a poppet valve, the static pressure changes drastically in the region of the opening at the valve seat as a function of the flow rate. This effect may be used effectively to reduce an increase in the quantity of control fluid that passes through the valve as the outflow quantity increases in that, due to the plate, the control fluid is tapped in an edge region of the main control cone.

BRIEF DESCRIPTION OF THE DRAWINGS

The present invention and its advantages are described in greater detail below with reference to the exemplary embodiments presented in the figures.

DETAILED DESCRIPTION OF THE PREFERRED EMBODIMENTS

Figure 1A:
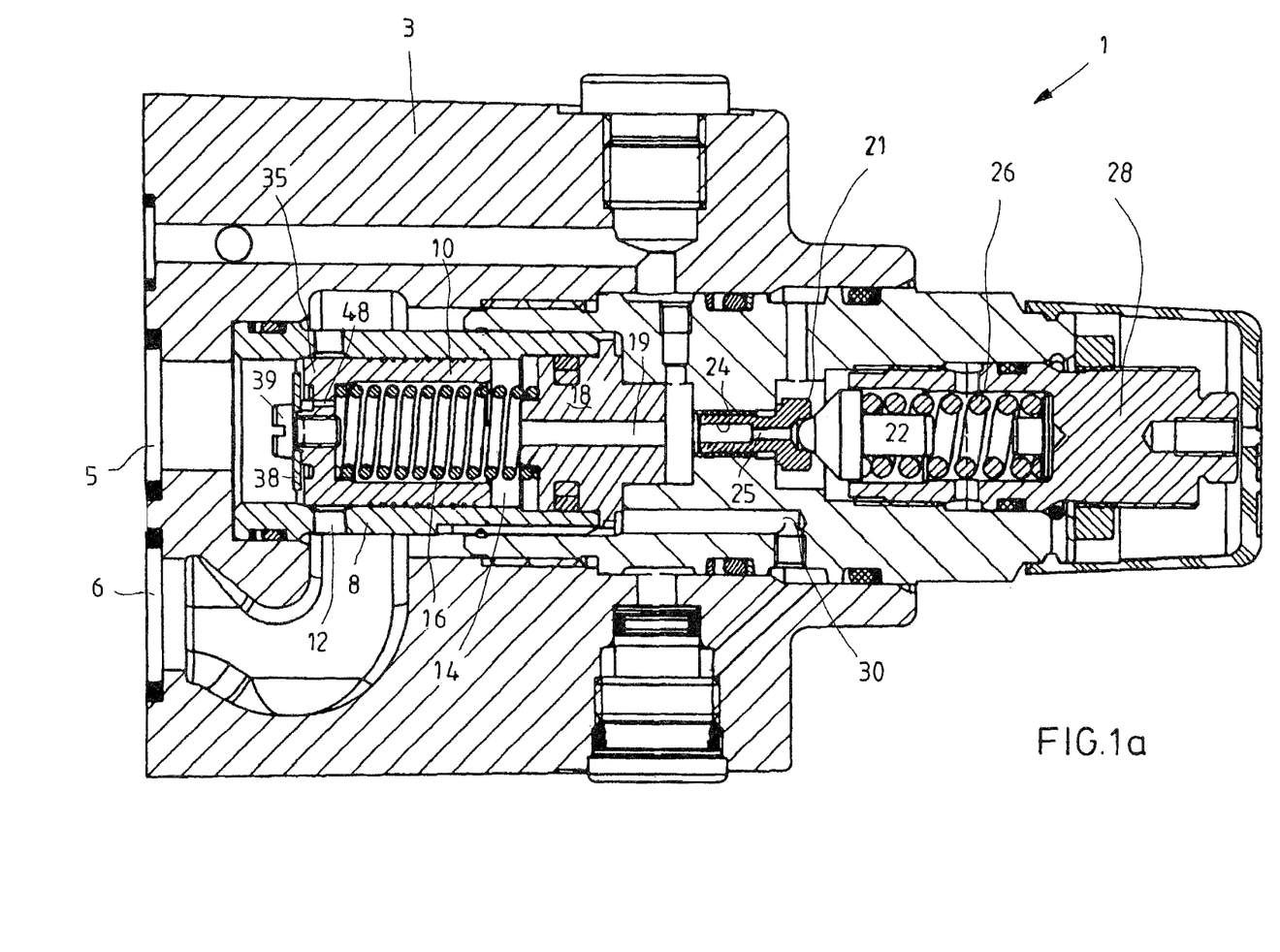
FIG. 1a shows a pilot-controlled pressure limiting valve designed as a poppet valve, the main control cone of which carries a plate on its end face, in a longitudinal sectional view along an axis of the main control cone.

According to FIG. 1a, a pilot-controlled pressure limiting valve 1 includes a valve housing 3, which is provided with an inlet connection 5 and a tank connection 6. A valve cartridge is screwed into valve housing 3. In terms of functionality, it is subdivided into a main stage and a precontrol stage. The main stage is composed essentially of a sleeve 8, in which a main control cone 10 is movably guided. The inner cross section of sleeve 8 tapers in the region of sleeve 8 that faces inlet connection 5, thereby forming a seat, against which main control cone 10 bears in the closed state of the main stage. Radial bores 12 are provided in sleeve 8, through which pressure medium flows from inlet connection 5 to tank connection 6 when the main stage is open. Main control cone 10 borders a spring chamber 14 in a section of sleeve 8 that faces away from inlet connection 5. A spring 16 is located therein, which acts on main control cone 10 in the closing direction. Spring 16 bears against an end cap 18 that is placed on sleeve 8. A fluid channel 19 extends through end cap 18 to the precontrol stage.

The precontrol stage is designed—with a sleeve insert 21 and a precontrol cone 22—as a pressure limiting valve with a seat-type design. A fluid channel 24 that tapers to form a damping nozzle 25 extends through sleeve insert 21 as an extension of fluid channel 19. The end-face opening of damping nozzle 25 that faces precontrol cone 22 is designed as a valve seat for precontrol cone 22. Precontrol cone 22 is acted upon by spring 26 in the direction of sleeve insert 21, so that, in the closed state of the precontrol stage, the opening of damping nozzle 25 facing the precontrol stage is closed. The force exerted by spring 26 on precontrol cone 22 may be adjusted using a screwed-in sleeve 28, in the internal bore of which spring 26 is supported. Control fluid that has been released from the precontrol stage via damping nozzle 25 is directed toward tank connection 6 via a channel 30.

A plate 38 is held a specified distance away from main control cone 10 using a screw 39. Covered by plate 38, a control fluid nozzle 48 directs control fluid from inlet connection 5—through head section 35 of main control cone 10—to spring chamber 14.

Figure 1B:
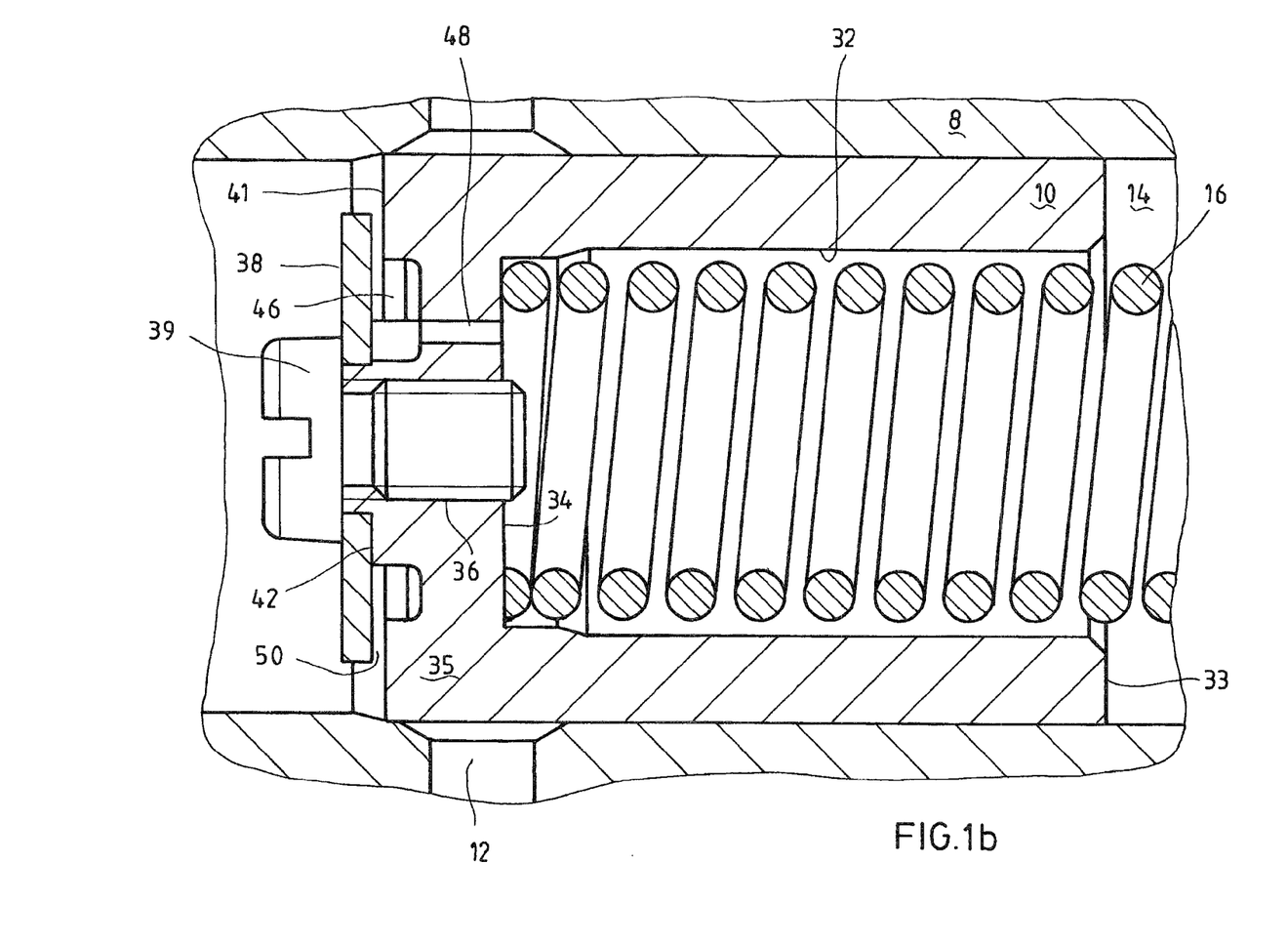
FIG. 1b shows an enlarged depiction of a region around the main control cone of the pressure limiting valve shown in FIG. 1a, FIG. 2 shows a main control cone provided with a plate, according to a further embodiment of the present invention.

The region around main control cone 10 is shown in an enlarged view in FIG. 1b. Main control cone 10 includes a rotationally symmetric body with a central, blind hole-type recess 32 that opens toward spring chamber 14 and accommodates the largest portion of spring 16. Main control cone 10 therefore borders spring chamber 14 with annular surface 33, the cylindrical jacket surface of recess 32, and end face 34 of recess 32. A bore 36 provided with an internal thread is formed in head section 35 of main control cone 10. Bore 36 serves to hold circular disk-shaped plate 38 against main control cone 10 using screw 39. Plate 38 rests on a raised area 42 in end surface 41 of main control cone 10 facing inlet connection 5. Raised area 42 extends essentially rotationally symmetrically around the region of centrally located fastening bore 36, but it has a smaller radial expansion than does plate 38. A gap 50 is therefore formed between plate 38 and end surface 41. An annular groove 46 is formed in a region of end surface 41 covered by plate 38. Annular groove 46 transitions into control fluid nozzle 48, which starts at end surface 41 and leads into blind-hole recess 32.

The mode of operation of inventive pressure limiting valve 1 is explained below.

Gap 50 forms—on the outer edge of plate 38 that faces end surface 41—an annular inlet opening for the internal supply of control fluid to spring chamber 14. Starting at gap 50, the control fluid path continues via annular groove 46 and control fluid nozzle 48 into recess 32 of main control cone 10, which opens toward spring chamber 14. Main control cone 10 is acted upon in the opening direction by the pressure that is present at inlet connection 5, from the side of inlet connection 5 and against its end surface 41. The force of spring 16 and the control pressure that is present in spring chamber 14 and acts on surfaces 33 and 34 act in the closing direction. Provided that precontrol cone 22 closes sleeve insert 21, the same pressure exists in spring chamber 14 as in inlet connection 5. Main control cone 10 therefore remains closed due to the action of spring 16. If the pressure in spring chamber 14 rises above a certain value—which may be adjusted by rotating screwed-in sleeve 28—precontrol stage 21, 22 opens and limits the pressure in spring chamber 14 to the value that was set. If the pressure that exists at the inlet connection now rises above a value that corresponds to the pressure equivalent of spring 16 relative to surface 41 plus the control pressure that exists in spring chamber 14, main control cone 10 lifts from its seat, thereby allowing pressure medium to flow out of inlet connection 5 through bore 12 to tank connection 6.

Static pressure decreases in a flowing fluid, per Bernoulli's equation. When fluid flows past open main control cone 10 and through bore 12, end surface 41 of main control cone 10 is therefore acted upon with a lower fluid pressure in its edge region. The force in the opening direction that results from the pressure application on end surface 41 is therefore also reduced. If main control cone 10 remains open, however, so that a certain quantity Q of pressure medium may flow toward tank connection 6, pressure P that exists in inlet connection 5 must increase in accordance with the force equilibrium that occurs at main control cone 10, in order to compensate for the pressure decrease that occurs at the edge of end surface 41. The closing force exerted by spring 16 also increases as the opening of main control cone 10 increases, thereby also contributing to a pressure increase when the quantity of fluid Q to be directed away increases.

If, as with conventional pressure limiting valves, the control fluid supplied to spring chamber 14 would be directed through a central nozzle bore in end surface 41, the pressure present in inlet connection 5 would remain nearly unchanged at the nozzle bore, since there is no fluid flow at this point. An increase in pressure in inlet connection 5 would therefore result in a corresponding pressure increase at the tap opening in the central nozzle bore. The result would be an increased quantity of control fluid, which reaches spring chamber 14 via a central nozzle bore of this type. Since channels 19 and 24 and damping nozzle 25 are further throttle points, and since the precontrol stage does not have an ideal control pressure-control fluid quantity characteristic curve either, the pressure in spring chamber 14 would increase, which would give rise to an additional pressure increase in inlet connection 5, upstream of end surface 41, in order to hold main control piston 10 open.

Due to plate 38, which is attached to main control cone 10 as a top part on end surface 41, the tap point for the control fluid is located in the edge region of end surface 41. More accurately, the tap point now corresponds to the annular opening of gap 50 that exists between the outer edge of plate 38 facing end surface 41, and end surface 41 itself. At the gap opening, an increase in the fluid pressure in inlet connection 5 that occurs when fluid quantity Q to be directed to tank increases is at least partially compensated for by the reduced fluid flow in the edge region of end surface 41. An increase in the quantity of control fluid directed to spring chamber 14 may therefore be diminished. As a result, there is less of a pressure increase in inlet connection 5, and fluid quantity Q to be directed away increases.

The radius of plate 38 must be tailored exactly to the conditions at valve 1. If plate 38 is too large, there is a risk that, if the flow rate increases and fluid quantity Q to be directed away increases, the pressure at the gap opening of gap 50 will be reduced to the point that spring chamber 14 is no longer adequately supplied with control fluid. If the pressure in spring chamber 14 would drop, it would then be possible for main control piston to open abruptly and to remain open even below the pressure that was set via the precontrol stage. With consideration for this safety aspect, the radius of plate 38 is selected such that it is ensured that spring chamber 14 is supplied adequately, even above the maximum volumetric flow rate that is permissible for pressure limiting valve 1.

Due to the long length of the gap opening, the gap dimensions may be very small, without a flow resistance occurring at gap 50 that is relevant compared with the flow resistance of control fluid nozzle 48. The small gap dimension results in a good rough filtration of the control fluid. Given, in particular, that control fluid nozzle 48 and/or channels 19 and 24, and damping nozzle 25 have a larger cross section than the gap dimension, blockage of the control fluid inflow and/or the precontrol stage is effectively prevented.

Plate 38 is very easy to manufacture, since it is designed in the shape of a circular disk with a hole. It may be manufactured, e.g., by cutting sections off of tubular material or rod material. Since plate 38 is subjected to slight mechanical loads, a material that is easy to process, e.g., non-hardened steel, aluminum, or brass, is advantageously used.

Figure 2:
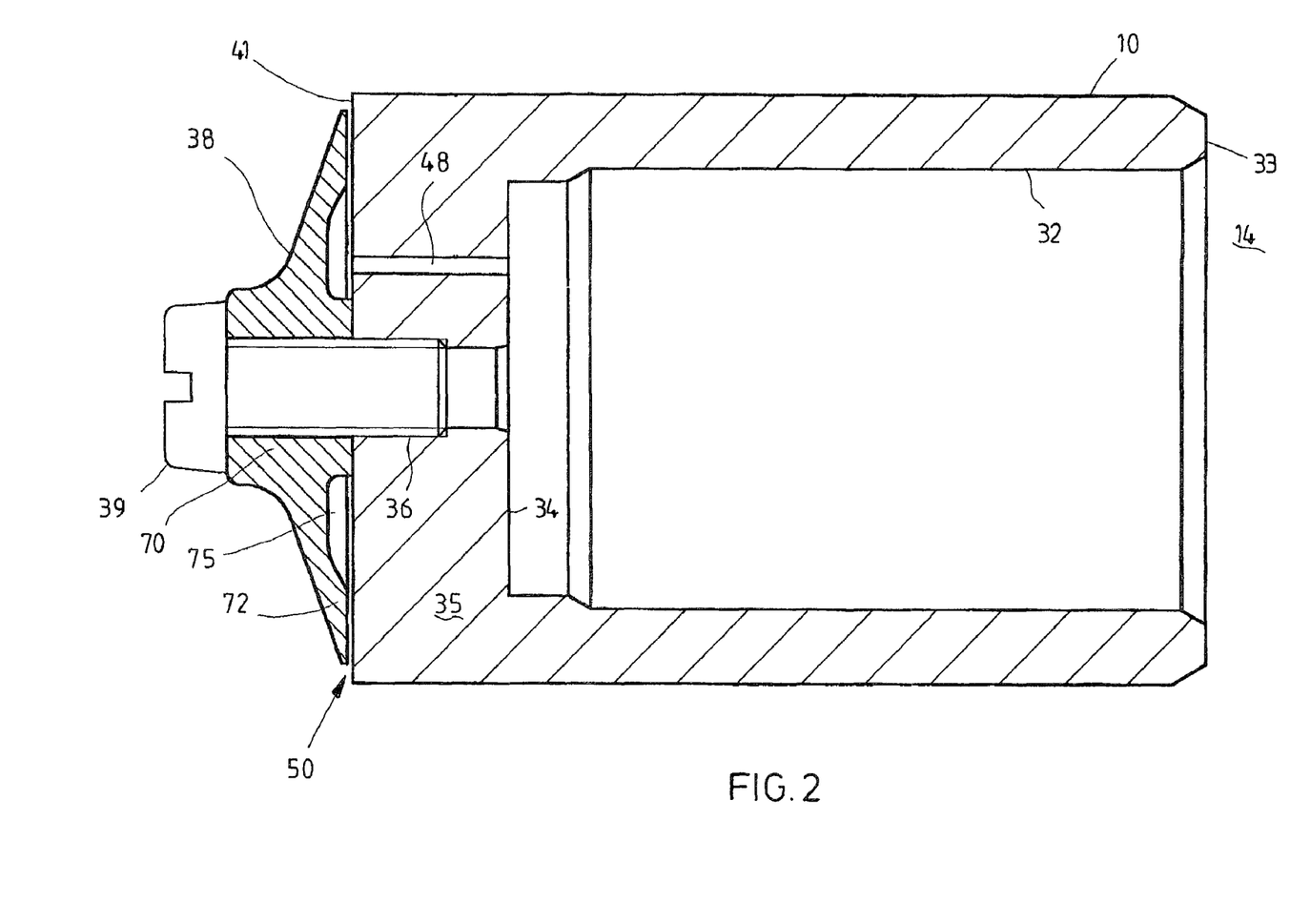

FIG. 2 shows a second embodiment of the present invention, which represents a slight modification of the embodiment described with reference to FIGS. 1a and 1b. The only difference between the first embodiment and the second embodiment is that main control cone 10 and plate 38 differ slightly, as explained in the description below. The further components of pressure limiting valve 1 correspond to the particular components of the first embodiment.

With main control cone 10 according to the second embodiment, the only essential difference is that the design of head section 35 differs slightly from that in the first embodiment. End surface 41, which terminates head section 35 of main control cone 10, is designed as a planar surface. Only central bore 36 with internal thread and control fluid nozzle 48 pass through head section 35, as shown.

Plate 38 is designed as a hat-shaped top part. It is composed of a sleeve-shaped central section 70 and a collar section 72, which extends radially away from central section 70. Central section 70 accommodates screw 39 in its sleeve opening and rests on end surface 41. Collar section 72 adjoins central section 70 at a certain axial distance from end surface 41. Close to central section 70, collar section 72 also includes an annular groove-type recess 75 on the side facing end surface 41.

Since central section 70 extends outwardly on the side of plate 38 that faces end surface 41, a hollow cylindrical gap 50 is formed between collar section 72 and end surface 41. An annular gap opening exists between the outer edge of collar section 72—which faces end surface 41—and end surface 41. The space between collar section 72 and end surface 41 increases in the region of annular groove-type recess 75. From there, covered by collar section 72, control fluid nozzle 48 leads through head section 35 to spring chamber 14.

The advantage of this design of main control cone 10 and plate 38 is that main control cone 10 requires minimal processing on head section 35, since—except for control fluid nozzle 38 and bore 36—it has a planar end surface 41. The gap dimension, the circumferential length of the opening of gap 50, and the depth of annular groove 75 are determined entirely by the design of plate 38. Since plate 38 is subjected to less mechanical stress than is main control cone 10, plate 38 may be made of a material that is easy to process, e.g., non-hardened steel, aluminum, or brass. As a result, it is favorable to perform as many process steps as possible that involve the control fluid supply, e.g., creating annular groove 75, on plate 38 rather than on main control cone 10.

Figure 3:
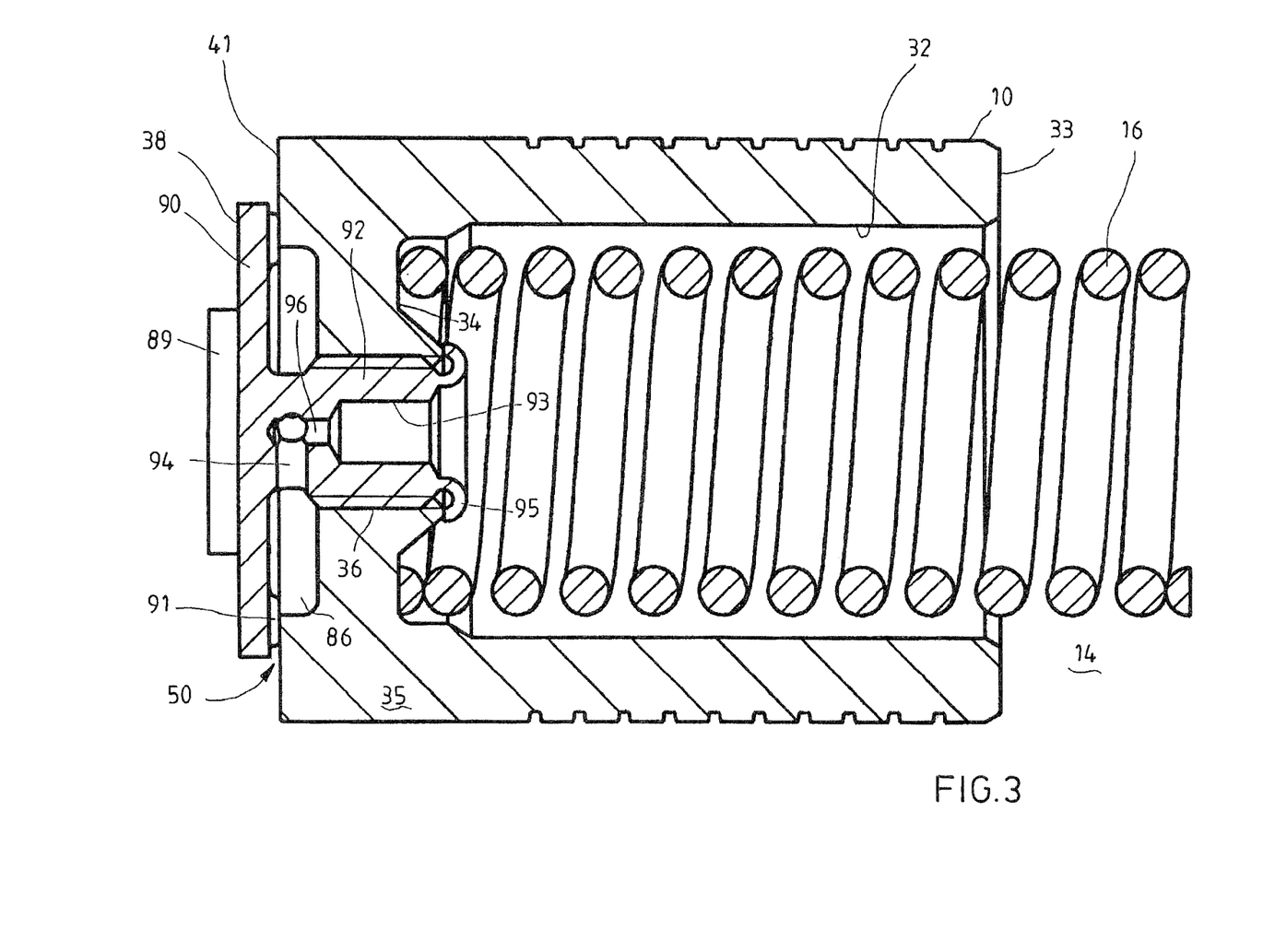
FIG. 3 shows a main control cone provided with a plate, according to a third embodiment of the present invention.

FIG. 3 shows a third embodiment of the present invention, which is a further design option for main control cone 10 with plate 38 attached thereto. The further components of pressure limiting valve 1 correspond to the particular components of the first embodiment.

With main control cone 10 according to the third embodiment, the only difference is that the design of head section 35 differs slightly from that in the first and second embodiments. Head section 35 is penetrated only by central bore 36. Bore 36 is provided with an inner thread. In addition, end surface 41 of head section 35 includes an axially symmetric recess 86 around bore 36.

Plate 38 has an essentially rotationally symmetric design and is subdivided into several sections along its axial direction. Facing inlet connection 5, plate 38 includes a head section 89, on which a key surface for placement of a fastening tool is formed. It transitions into a circular disk-shaped section 90, which extends radially beyond recess 86. Plate 38 rests on end surface 41 via embossed, nub-shaped bulges 91 on circular disk-shaped section 90. Nub-shaped bulges 91 are formed radially outside of recess 86. The view shown in FIG. 3 arises from the fact that bulges 91 are located in a plane that is positioned at a 45° angle relative to the cutting plane shown. Due to bulges 91, it is ensured that circular disk-shaped section 90 and end surface 41 are located a certain distance away from each other. A fastening section 92 abuts circular disk-shaped section 90. It has an essentially circular-cylindrical shape and is provided with an external thread. Fastening section 92 is provided with a stepped bore 93 along the longitudinal axis, which tapers to form a control fluid nozzle 96. Three radial bores 94, which are offset by 120°, are provided in fastening section 92 near the transition from circular disk-shaped section 90 to fastening section 92. Radial bores 94 abut control fluid nozzle 96. Fastening section 92 transitions on its side facing away from inlet connection 5 into a curved edge section 95.

A gap 50 is formed between circular disk-shaped section 90 and end surface 41. An annular gap opening exists on the outer edge of circular disk-shaped section 90, which faces end surface 41. The gap dimension is determined by nub-shaped bulges 91. Control fluid is therefore supplied to spring chamber 14 via gap 50, which transitions into recess 86, and via the bores located inside fastening section 92, i.e., bores, control fluid nozzle 96, and bore 93. Plate 38 is held reliably and non-rotatably on main control cone 10 via curved edge section 95.

With this design of plate 38 and main control cone 10 as well, only a few processing steps need be carried out on head section 35 of main control cone 10. These processing steps, i.e., creating bore 36 and recess 86, are uncomplicated and require minimal outlay. In particular, no small-diameter bores are required, which would oxidize in a hardening process. The plate is preferably made of a metal that is easy to work with, e.g., brass, aluminum, or non-hardened steel. Due to the shape of plate 38, it is easy to manufacture on a lathe with only a few post-processing steps. Bulges 91 may be created, e.g., using a simple embossing procedure.

With a pilot-controlled pressure limiting valve designed as a gate valve (not shown)—e.g., as described in data sheet RD 25731/10.05 mentioned above—similar effects occur at the control fluid inlet on the main control slide, due to flow forces. The present invention may therefore be used by installing a plate on the main control slide as with this type of valve, as described with reference to FIGS. 1*a*, 1*b*, 2 and 3.

In terms of the design of plate 38, the present invention is not limited to a rotationally symmetric design. If necessary, an oval plate, for example, may also be used. The present invention is based on the finding that designing the control fluid inlet as a gap between a plate and an end surface of the main control element results in an improvement of the constant-pressure behavior and in reliable filtration of the control fluid, while requiring a minimal amount of additional work to manufacture the pressure limiting valve.

LIST OF REFERENCE NUMERALS

1 Pilot-controlled pressure limiting valve
3 Valve housing
5 Inlet connection
6 Tank connection
8 Sleeve
10 Main control cone
12 Bore
14 Spring chamber
16 Spring
18 End cap
19 Fluid channel
21 Sleeve insert
22 Precontrol cone
24 Fluid channel
25 Damping nozzle
26 Spring
28 Screwed-in sleeve
30 Fluid channel
32 Blind hole recess
33 Annular surface
34 End face
35 Head section
36 Bore
38 Plate
39 Screw
41 End face
42 Raised area
46 Annular groove
48 Control fluid nozzle
50 Gap
70 Central section
72 Collar section
75 Annular groove-type recess
86 Recess
89 Head section
90 Circular disk-shaped section
91 Bulge 92 Fastening section
93 Longitudinal bore
94 Radial bore
95 Edge section
96 Control fluid nozzle

What is claimed is:

1. A pilot-controlled pressure limiting valve with a control element (10) that may be acted upon in the opening direction, against a first control surface (41), by a pressure which is to be limited, and that may be acted upon in the closing direction by a spring (16) and, against a second control surface (33, 34), by a control pressure that exists in a control pressure chamber (14), and with a precontrol valve (21, 22), via which the pressure present in the control pressure chamber (14) may be limited, it being possible to supply control fluid to the control pressure chamber (14) through the control element (10) via a control fluid nozzle (48),
wherein, in front of the first control surface (41), a plate (38) is held on the control element (10), a gap (50) is formed between the plate (38) and the first control surface (41) with a predefined gap dimension, and the gap (50) is located upstream of the control fluid nozzle (48), wherein the gap forms an annular tap point for the control fluid between an outer edge of the plate (38) and the first control surface (41).

2. The pilot-controlled pressure limiting valve according to claim 1, wherein the control element (10) includes a raised area (42), against which the plate (38) bears.

3. The pilot-controlled pressure limiting valve according to claim 1, wherein a raised area (91) is formed on a side of the plate (38) facing the control element (10), via which the plate (38) bears against the control element (10).

4. The pilot-controlled pressure limiting valve according to claim 3, wherein the raised area (91) is designed as a nub-shaped embossing of the plate (38).

5. The pilot-controlled pressure limiting valve according to claim 1, wherein the plate (38) includes a sleeve-shaped section (70) that projects from a side of the plate (3R) facing the control element (10) and that accommodates a fastening means (39), and via which the plate (38) rests on the control element (10).

6. The pilot-controlled pressure limiting valve according to claim 1, wherein a circular cylinder-shaped threaded section (92) is formed on the plate (38), with which the plate (38) is fastened in a bore (36) of the control element (10).

7. The pilot-controlled pressure limiting valve according to claim 6, wherein the fluid control nozzle is designed as a bore (96) in the threaded section (92).

8. The pilot-controlled pressure limiting valve according to claim 1, wherein the fluid control nozzle is designed as a bore (48) in the control element (10), and an opening in the bore (48) is covered by the plate (38).

9. The pilot-controlled pressure limiting valve as recited in claim 1, wherein the plate (38) is designed essentially in the shape of a circular disk.

10. The pilot-controlled pressure limiting valve as recited in claim 1, wherein the plate (38) is made of an easily-worked metal, wherein the metal is selected from the group consisting of non-hardened steel, aluminum, or brass.

11. The pilot-controlled pressure limiting valve as recited in claim 1, wherein the gap dimension is smaller than a diameter of the control fluid nozzle (48).

12. The pilot-controlled pressure limiting valve according to claim 1, wherein the gap dimension is smaller than a smallest diameter of a channel (19, 24) from the control pressure chamber (14) to the precontrol valve (21, 22).

13. The pilot-controlled pressure limiting valve as recited in claim 1, wherein the gap dimension is less than 0.3 millimeters.

14. The pilot-controlled pressure limiting valve according to claim 1, wherein the control fluid nozzle (48; 96) opens toward an annular recess (46; 86) in the first control surface (41) and/or toward an annular recess (75) in a side of the plate (38) facing the first control surface (41).

15. The pilot-controlled pressure limiting valve as recited in claim 1, wherein the plate (38) is retained on the control element of the pressure limiting valve.

16. The pilot-controlled pressure limiting valve according to claim 12, wherein the gap dimension is smaller than a diameter of a damping nozzle (25) downstream of the pre-control valve (21, 22).

17. The pilot-controlled pressure limiting valve as recited in claim 13, wherein the gap dimension has a value of 0.15 millimeters to 0.25 millimeters.

* * * * *